Patented July 11, 1950

2,514,376

UNITED STATES PATENT OFFICE 2,514,376

TRIACYL NITROPHENYLPROPANEAMINO-DIOLS AND PREPARATION THEREOF

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,177

12 Claims. (Cl. 260—490)

This application is a continuation-in-part of our copending application Serial No. 15,264, now U. S. Patent 2,483,884, filed March 16, 1948, and the invention relates to new chemical compounds and to chemical methods useful for their synthesis. More particularly, the invention relates to a new class of polyacylated amino diols and to methods for obtaining these products. The polyacylated amino diols of the invention have the formula,

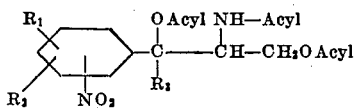

where $R_1$ and $R_2$ are the same or different and represent hydrogen, halogen, lower alkyl or lower alkoxy radicals and $R_3$ is hydrogen or a lower alkyl radical. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, aralipathic acyl, furoyl, pyridinoyl and the like radicals.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" (reg.) series or form and to the trans disastereoisomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula is to be interpreted in its generic sense, that is, as representing the (l)-$\psi$, (d)-$\psi$, (l)-reg. or (d)-reg. isomers in separated form as well as the (dl)-$\psi$ or the (dl)-reg. optical racemates or the total unresolved mixture of structural and optical isomers. Such a formula does not merely represent the unresolved mixture of isomers.

In accordance with the invention polyacylated amino diols of the above general formula are produced by ring-nitrating a compound of formula,

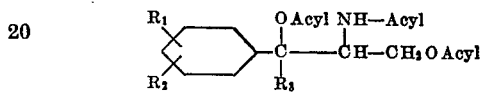

where $R_1$ and $R_2$ are the same or different and represent hydrogen, halogen, lower alkyl or lower alkoxy radicals and $R_3$ is hydrogen or a lower alkyl radical. This nitration can be carried out using "mixed acid," that is, a mixture of concentrated nitric and sulfuric acids; 100% nitric acid or fuming nitric acid. The preferred temperature for the reaction is in the neighborhood of 0° C. but in practice a rather wide range of temperature is permissible. The lower limit of the temperature range for this reaction is about —50° C. while the upper limit is, in general, about 25° C. When fuming nitric acid or 100% nitric acid is employed the reaction can be carried out at even higher temperatures, that is, up to about 50 to 55° C.

Another method which can be used to prepare these polyacylated amino diols of the present invention consists in acylating a compound of formula,

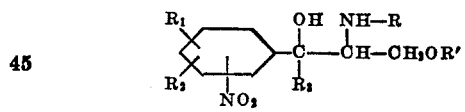

where R and R' are the same or different and represent hydrogen or acyl radicals, $R_1$ and $R_2$ are the same or different and represent hydrogen, halogen, lower alkyl or lower alkoxy radicals and $R_3$ is hydrogen or a lower alkyl radical. As the acylating agent either acyl halides or acyl anhydrides can be used. These acylating agents, which are preferably employed under substantially anhydrous conditions, can be used alone or in conjunction with alkaline catalysts such as the alkali and alkaline earth metal hydroxides, carbonates and oxides; the organic tertiary bases and the like. Some specific examples of suitable alkaline catalysts or substances are sodium hydroxide, potassium hydroxide, lithium hydroxide, barium hydroxide, potassium carbonate, calcium oxide, pyridine, dimethylaniline, N-ethylpiperidine, N-ethylmorpholine, quinoline, triethylamine and the like. In general, when no alkaline catalyst is employed the reactants must be heated together in order to bring about the reaction within a reasonable time. In most instances a heating period of several hours suffices. Where an alkaline catalyst is employed heating is usually not necessary as the reaction proceeds with sufficient rapidity at moderate temperatures, that is, below about 50° C. In some instances, however, where the acyl halide or anhydride is not particularly reactive it is advantageous to carry out the reaction at a temperature above about 50° C.

This acylation process can also be carried out in an aqueous medium. This is most conveniently accomplished by using a two-phase reaction mixture, that is, one consisting of water and a water immiscible organic solvent such as ethyl acetate, ether, chloroform and ethylene dichloride. In such a case it is preferable to carry out the reaction at about 25° C. or below and to employ a weakly alkaline material in conjunction with the acyl halide or anhydride. Some examples of the weakly alkaline materials which can be used are calcium carbonate, magnesium carbonate, barium carbonate and the like.

The alternate method for preparing the products of the invention finds particular use where the acyl groups present in the unnitrated amino diol are such that they are likely to be altered or split off during the nitration procedure with resultant low yields of the desired products. In such a case it is many times more advantageous to first prepare the polyacylated nitro compound having unalterable acyl groups, remove all or a portion of the acyl groups by hydrolysis, and reacylate the amino diol derivative with an acylating agent containing a more sensitive or alterable acyl group. In this manner the over-all yield of certain of the desired products is actually increased over that obtainable by the more direct nitration process. This is but one illustration of an application of the alternate method of synthesis and it should be understood that it is not always necessary, as will be apparent from the following description, to first prepare one of the products of the invention in order to obtain the starting materials used in the practice of this alternate process.

The polyacylated nitrophenylamino diol compounds of the invention are valuable intermediates for the preparation of other organic compounds. They are of particular value as intermediates in the preparation of organic compounds possessing antibiotic activity. For example, the products containing the basic structure

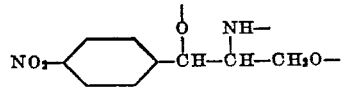

can be converted by hydrolysis to the corresponding free amino diol, resolved, if necesary, into their structural and optical isomeric forms and the (1)-ψ-1-p-nitrophenyl-2-aminopropane-1,3-diol dichloroacetylated to obtain (1)-ψ-1-p-nitrophenyl-2-dichloroacetamidopropane-1,3-diol, a compound possessing outstanding and unique antibiotic activity. This same product can also be prepared by selective hydrolysis of the (1)-ψ form of these particular compounds of the invention if the amino nitrogen atom thereof is substituted by a dichloroacetyl group.

The invention is illustrated by the following examples.

*Example 1*

(a) 2 g. of the triacetate of (dl)-ψ-1-phenyl-2-aminopropane-1,3-diol is added in small portions to a mixture composed of 2.5 cc. of concentrated nitric acid and 2.5 cc. of concentrated sulfuric acid. The temperature of the nitrating mixture is maintained at about 0° C. and the reaction continued until solution of the amino-diol derivative is complete. The reaction mixture is poured onto 250 g. of ice and the resulting solution extracted with several portions of ethyl acetate. After washing with sodium carbonate solution the ethyl acetate is distilled from the combined extracts in vacuo and the residual triacetate of (dl)-ψ-1-p-nitrophenyl-2-aminopropane-1,3-diol purified by recrystallization from ethanol. This product which melts at 145° C. has the formula,

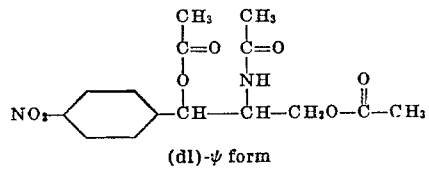

(dl)-ψ form (b) 10 g. of (dl)-ψ-1-phenyl-2-acetamido-1,3-diacetoxypropane is added in small portions with stirring to a mixture consisting of 40 cc. of nitrite-free concentrated nitric acid and 20 cc. of concentrated sulfuric acid at 0° C. After the addition has been completed the solution is allowed to warm to room temperature, poured over crushed ice and the solution neutralized with solid sodium bicarbonate. The precipitated solid is collected and crystallized from ethanol and from water to obtain the pure (dl)-ψ-1-p-nitrophenyl-2-acetamido-1,3-diacetoxypropane; M. P. 146–7° C.

(c) 20 g. of (dl)-ψ-1-phenyl-2-acetamido-1,3-diacetoxypropane is added in small portions to 75 cc. of nitrite-free fuming nitric acid (sp. g. 1.54) at −30° C. with stirring. The solution is slowly warmed to +30° C. and then quenched on ice. The reaction mixture is neutralized with sodium hydroxide solution, the precipitate which separates collected and purified by recrystallization from ethanol to obtain the desired (dl)-ψ-1-p-nitrophenyl-2-acetamido-1,3-diacetoxypropane; M. P. 146–7° C. This product is identical with that obtained by the procedures described above.

(d) 15 g. of (dl)-ψ-1-phenyl-2-acetamido-1,3-diacetoxypropane is added in small portions to 45 cc. of nitrite-free fuming nitric acid (sp. g. 1.5) at 0° C. with stirring. The temperature of the reaction mixture is raised to 40° C. over a period of one-half hour and then poured onto ice. The solution is neutralized with solid sodium carbonate and the product which precipitates collected. Recrystallization from ethanol yields the desired (dl)-ψ-1-p-nitrophenyl-2-acetamido-1,3-diacetoxypropane in pure form; M. P. 146–7° C.

(e) 15 g. of (dl)-ψ-1-phenyl-2-acetamido-1,3-diacetoxypropane is added in small portions to 40 cc. of nitrite-free fuming nitric acid (sp. g. 1.5), the temperature being held at 30-35° C. by intermittent addition of dry ice. After about fifteen minutes the solution is quenched on ice, neutralized with sodium bicarbonate and filtered. The solid after recrystallization from ethanol melts at 146-7° C. and consists of pure (dl)-ψ-1-p - nitrophenyl - 2 - acetamido - 1,3 - diacetoxypropane.

(f) 3 g. of (dl)-ψ-1-p-nitrophenyl-2-acetamido-3-acetoxypropane-1-ol is allowed to stand for eighteen hours in a mixture composed of 3 cc. of dry pyridine and 1.5 cc. of acetic anhydride. The reaction mixture is evaporated to dryness in vacuo and the residue recrystallized from ethanol and from water to obtain the desired (dl) - ψ - 1 - p - nitrophenyl - 2 - acetamido - 1,3-diacetoxypropane; M. P. 146-7° C.

*Example 2*

(a) 10 g. of the triacetate of (dl)-reg.-1-phenyl-2-aminopropane-1,3-diol is added in small portions to a mixture composed of 12.5 cc. of concentrated nitric acid and 12.5 cc. of concentrated sulfuric acid at 0° C. After the addition has been completed, the temperature is maintained at 0° C. until solution is complete and then the reaction mixture poured onto 1250 g. of ice. The solution is extracted with several portions of ethyl acetate, the ethyl acetate extracts washed with dilute sodium carbonate solution and the ethyl acetate removed by distillation in vacuo. The residue which consists of the triacetate of (dl)-reg.-1-p-nitrophenyl-2-aminopropane-1,3-diol is purified by recrystallization from ethanol. This product has the formula,

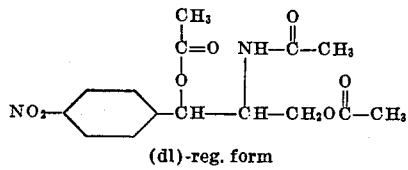

(dl)-reg. form (b) A mixture containing 60 cc. each of concentrated sulfuric acid and nitrite-free nitric acid is cooled to −30° C. and 25 g. of (dl)-reg.-1-phenyl-2-acetamido-1,3-diacetoxypropane added with stirring while keeping the temperature between −30 and −60° C. The mixture is allowed to warm to +10° C. and then quenched by pouring onto ice. The solution is neutralized by the addition of solid sodium bicarbonate and the precipitated solid collected. Recrystallization from ethyl acetate and from ethanol yields the pure (dl) - reg. - 1 - p - nitrophenyl - 2 - acetamido - 1,3-diacetoxypropane; M. P. 157-8° C.

(c) 25 g. of (dl)-reg.-1-phenyl-2-acetamido-1,3-diacetoxypropane is added in small portions to 100 cc. of nitrite-free fuming nitric acid (sp. g. 1.54) at −50 to −60° C. with stirring. The reaction mixture is allowed to warm to −40° C. and then poured onto ice. The solution is neutralized with sodium carbonate, filtered and the solid product recrystallized from ethyl acetate to obtain the desired (dl)-reg.-1-p-nitrophenyl-2-acetamido-1,3-diacetoxypropane; M. P. 157-8° C.

*Example 3*

200 mg. of the diacetate of (dl)-reg.-1-phenyl-2-dichloroacetamidopropane-1,3-diol is added to a mixture consisting of 0.25 cc. of concentrated nitric acid and 0.25 cc. of concentrated sulfuric acid at 0° C. The reaction mixture is stirred until solution is complete, poured onto 25 g. of ice and the mixture extracted with ethyl actate. The ethyl acetate extracts are evaporated under reduced pressure and the diacetate of (dl)-reg.-1-p - nitrophenyl - 2 - dichloroacetamidopropane-1,3-diol so produced purified by recrystallization from ethanol; M. P. 134° C. This compound has the following formula,

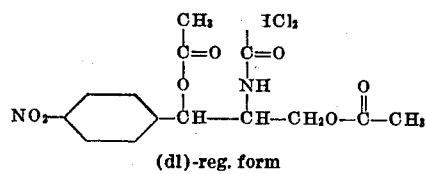

(dl)-reg. form

*Example 4*

(a) 2.5 g. of (l)-ψ-1-phenyl-2-acetamido-1,3-diacetoxypropane is added in small portions to 8 cc. of nitrite-free fuming nitric acid at 0-10° C. with stirring. After about one-half hour the reaction mixture is poured onto ice, neutralized with solid sodium carbonate and the precipitated solid collected. Recrystallization from ether-petroleum ether mixture yields the desired (l)-ψ - 1 - p - nitrophenyl - 2 - acetamido-1,3-diacetoxypropane; M. P. 109-111° C. This product has the formula,

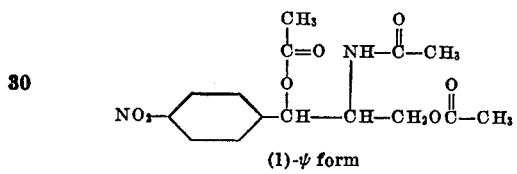

(l)-ψ form

If desired the 8 cc. of fuming nitric acid used above can be replaced with a mixture consisting of 7 cc. of concentrated sulfuric acid and 7 cc. of concentrated nitric acid and essentially the same yield of the final product obtained.

(b) A mixture consisting of 5 cc. of acetic anhydride, 5 cc. of dry pyridine and 1 g. of (l)-ψ-1-p-nitrophenyl-2-aminopropane-1,3-diol is allowed to stand overnight at 25° C. The reaction mixture is evaporated to dryness in vacuo, washed with a small amount of water and the insoluble material crystallized from ether-petroleum ether mixture to obtain the desired (l)-ψ-1-p-nitrophenyl-2-acetamido-1,3-diacetoxypropane; M. P. 109-111° C.

*Example 5*

6 g. of the triphenylacetyl derivative of (dl)-ψ-1-phenyl-2-aminopropane-1,3-diol is added slowly with stirring to 35 cc. of nitrite-free fuming nitric acid at 0° C. and the clear solution allowed to warm to 25° C. over a period of about one hour. The reaction mixture is poured onto ice, neutralized with solid sodium carbonate and the precipitated solid collected. Recrystallization from acetone-methanol mixture yields the desired (dl) - ψ - 1 - p - nitrophenyl-2-p'-nitrophenylacetamido - 1,3 - di - p' - nitrophenylacetoxypropane of the formula,

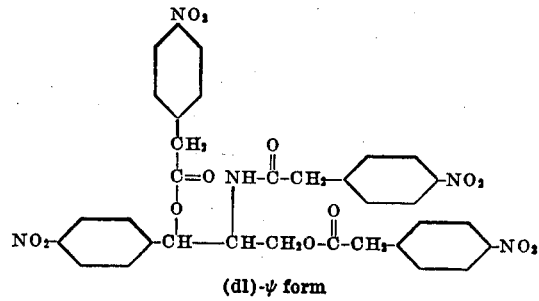

(dl)-ψ form

Example 6

4 g. of (dl)-ψ-1-phenyl-2-dichloroacetamido-1,3-dimonochloracetoxypropane is added slowly to 15 cc. of nitrite-free fuming nitric acid at 0° C. and the solution allowed to stand for one-half hour. The reaction mixture is poured onto ice, neutralized with solid sodium carbonate and the gummy product collected. The product is recrystallized from methanol to obtain the pure (dl)-ψ-1 - p - nitrophenyl - 2 - dichloracetamido-1-3-di-monochloracetoxypropane of formula,

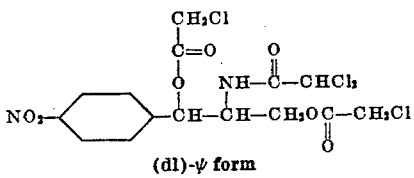

(dl)-ψ form

Example 7

6 g. of the triacetate of (dl)-ψ-1-o-methylphenyl - 2 - aminopropane-1,3-diol is added in small portions to a nitrating mixture composed of 7.5 cc. of concentrated nitric and 7.5 cc. of concentrated sulfuric acid while keeping the temperature at about 0° C. The reaction mixture is stirred until solution is complete and then poured onto 750 g. of ice. The solution is extracted with several portions of ethyl acetate, the extracts washed with sodium carbonate solution and the ethyl acetate distilled. The residue which consists principally of the triacetate of (dl)-ψ-1-o-methyl - p - nitrophenyl - 2 - aminopropane-1,3-diol of formula,

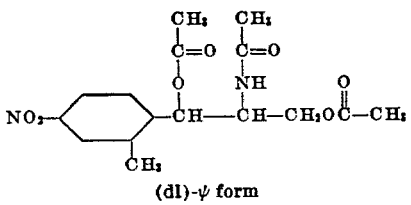

(dl)-ψ form can be purified by recrystallization from ethanol.

If desired the corresponding tripropionate derivative can be substituted for the triacetyl derivative used above to obtain (dl)-ψ-1-p-nitrophenyl - 2 - propionamido - 1,3 - dipropionoxypropane.

Example 8

5 g. of the tribenzoyl derivative of (dl)-ψ-1-(m-methoxyphenyl)-2-aminopropane-1,3-diol is added slowly to 15 cc. of nitrite-free fuming nitric acid at 10° C. with stirring. The solution is allowed to come to room temperature over a period of one-half hour, poured onto ice and neutralized with solid sodium carbonate. The solid which precipitates is collected and crystallized from acetone-ethyl acetate mixture to obtain the pure (dl)-ψ-1-(m-methoxy-p-nitrophenyl)-2-benzamido-1,3-dibenzoyloxypropane of formula,

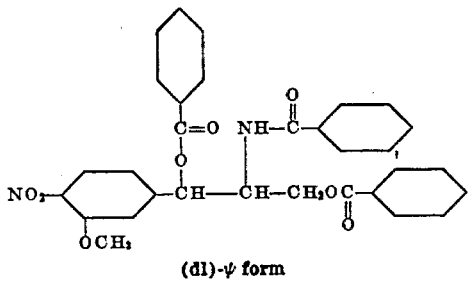

(dl)-ψ form

This same product can be obtained if 30 cc. of 1:1 by volume concentrated sulfuric acid-nitric acid mixture is substituted for the fuming nitric acid used in the above procedure.

Example 9

4 g. of the triacetate of (dl)-ψ-1-m-methoxyphenyl-2-aminopropane-1,3-diol is added to a mixture consisting of 5 cc. of concentrated nitric acid and 5 cc. of concentrated sulfuric acid while maintaining the temperature at 0° C. The reaction mixture is stirred until solution is complete and then poured onto 500 g. of ice. The solution is extracted with ethyl acetate, the extracts washed with sodium carbonate solution and the ethyl acetate distilled. The residue consists principally of the desired triacetate of (dl) - ψ - 1 - m - methoxy - p - nitrophenyl - 2 - aminopropane-1,3-diol which has the formula,

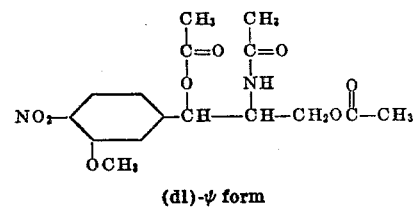

(dl)-ψ form

The contaminating isomeric nitration products can be removed from the desired product by fractional recrystallization from alcohol.

Example 10

3.9 g. of (dl)-ψ-1-o-chlorophenyl-2-benzamido-1,3-diacetoxypropane is added slowly to 16 cc. of nitrite-free fuming nitric acid (sp. g. 1.5) at 15° C. The mixture is allowed to come to room temperature over a period of one and a half hours with stirring and then poured onto chopped ice. The acid is neutralized with solid sodium bicarbonate and the solid product collected. Recrystallization from methanol yields the pure (dl) - ψ - 1 - (o - chloro - p - nitrophenyl) - 2 - benzamido-1,3-diacetoxypropane of formula,

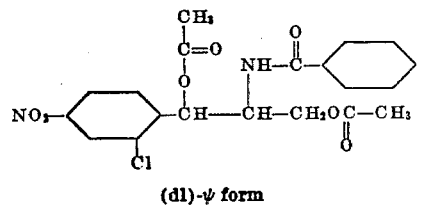

(dl)-ψ form

If desired the above nitration can be carried out using 30 cc. of a 2:1 mixture of concentrated nitric and concentrated sulfuric acids instead of fuming nitric acid.

Example 11

10 g. of the tri-3',4'-dichlorobenzoyl derivative of (dl)-ψ-1-phenyl-2-aminopropane-1,3-diol is added slowly to 40 cc. of nitrite-free fuming nitric acid at 0° C. After the reaction mixture has been allowed to stand for one hour it is poured onto ice, neutralized with solid sodium carbonate and the insoluble product collected. Recrystallization from acetone-ethanol mixture yields the desired (dl)-ψ-1-p-nitrophenyl-2-

(3',4' - dichlorobenzamido) - 1,3 - di - (3',4' - dichlorobenzoyloxy)-propane of formula,

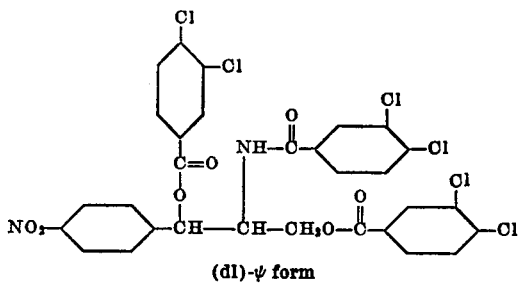

(dl)-ψ form

Use of the corresponding tri-p-methylbenzoyl derivative in the above procedure results in the production of (dl)-ψ-1-p-nitrophenyl-2-(p'-methylbenzamido) - 1,3 - di - (p' - methylbenzoyloxy)-propane.

Example 12

8 g. of the triacetate of (dl)-reg.-1-m-methoxyphenyl-2-aminopropane-1,3-diol is added to a nitrating mixture composed of 10 cc. of concentrated nitric acid and 10 cc. of concentrated sulfuric acid while maintaining the temperature at 0° C. The reaction mixture is stirred until solution is complete and then poured onto 1000 g. of ice. The crude triacetate of (dl)-reg.-1 - m - methoxy - p - nitrophenyl - 2 - aminopropane-1,3-diol is recovered from the solution by extraction with ethyl acetate and the ethyl acetate distilled from the extracts. This product which has the formula,

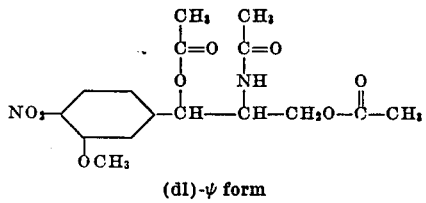

(dl)-ψ form can be purified by recrystallization from ethanol.

Example 13

8 g. of the triacetate of (dl)-reg.-1-(3',4'-dimethylphenyl)-2-aminopropane-1,3-diol is nitrated at 0° C. with a mixture consisting of 10 cc. of concentrated nitric acid and 10 cc. of concentrated sulfuric acid, the reaction mixture poured onto 1000 g. of ice and the desired triacetate of (dl)-reg.-1-(2'-nitro-4',5'-dimethylphenyl)-2-aminopropane-1,3-diol recovered from the solution by extraction with ethyl acetate followed by distillation of the solvent from the extracts. This product which can be purified by recrystallization from ethanol has the formula,

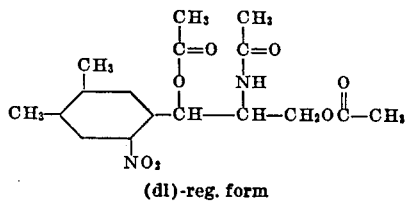

(dl)-reg. form

Example 14

6 g. of the triacetate of (dl)-ψ-2-amino-3-phenylbutane-1,3-diol is added to a nitrating mixture consisting of 7.5 cc. of concentrated nitric acid and 7.5 cc. of concentrated sulfuric acid at 0° C. The reaction mixture is stirred until solution is complete and then poured onto 750 g. of ice. The solution is extracted with ethyl acetate, the extracts washed with sodium carbonate solution and dried. Distillation of the ethyl acetate yields the desired triacetate of (dl)-ψ-2-amino-3-p-nitrophenylbutane-1,3-diol of formula,

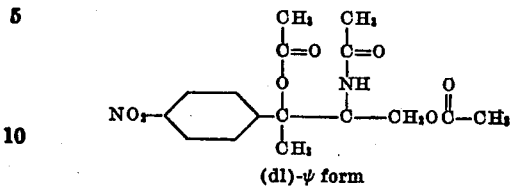

(dl)-ψ form

Example 15

10 g. of the triacetate of 1-o-chlorophenyl-2-aminopropane-1,3-diol is added in small portions to a nitrating mixture composed of 15 cc. of concentrated nitric acid and 15 cc. of concentrated sulfuric acid keeping the temperature in the neighborhood of 0° C. When solution of the solid is complete the reaction mixture is poured onto 1500 g. of ice and the solution extracted with several portions of ethyl acetate. The ethyl acetate extracts are washed with sodium carbonate solution, dried and the ethyl acetate removed by distillation in vacuo. The residual triacetate of 1-(2'-chloro-5' - nitrophenyl) - 2 - aminopropane-1,3-diol of formula,

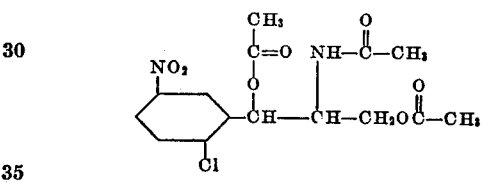

Unresolved is purified, if desired, by recrystallization from alcohol.

Example 16

2 g. of (dl)-ψ-1-p-nitrophenyl-2-lactamidopropane-1,3-diol or the corresponding acetoxy lactamido derivative is heated at 85° C. with a mixture consisting of 10 cc. of dry pyridine and 5 cc. of acetic anhydride for one hour. The liquids are evaporated in vacuo, the gummy residue taken up in ether and washed successively with dilute hydrochloric acid solution, sodium bicarbonate solution and water. The ether extract is dried, the ether evaporated and the residue crystallized from ether-petroleum ether mixture to obtain the pure (dl)-ψ-1-p-nitrophenyl - 2 - acetoxylactamido-1,3-diacetoxypropane of formula,

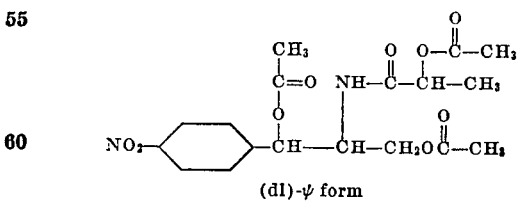

(dl)-ψ form

Example 17

2 g. of (dl)-ψ-1-p-nitrophenyl-2-cyanoacetamidopropane-1,3-diol (prepared by the reaction of the free amino diol with ethyl cyanoacetate in the presence of sodium methoxide) is added to 5 cc. of dry pyridine and the solution cooled to 0° C. 2 g. of benzoyl chloride is added and the solution allowed to stand for one hour. The reaction mixture is diluted with water, extracted with ethyl acetate and the extract washed successively with dilute hydrochloric acid, sodium bicarbonate solution and water. The ethyl acetate extract is dried and the ethyl acetate distilled in vacuo to obtain the crystalline (dl)-ψ-1-p-nitrophenyl-2-cyanoacetamido-1,3-dibenzoyloxypropane of formula,

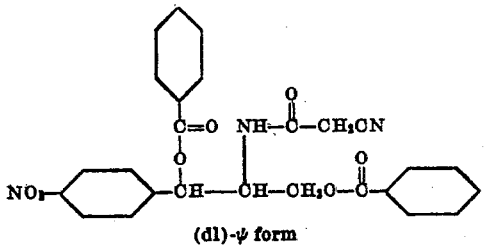

(dl)-ψ form

*Example 18*

2.12 g. of (dl)-ψ-1-p-nitrophenyl-2-aminopropane-1,3-diol in 10 cc. of dry pyridine is treated with 8 g. of furoic anhydride and the solution heated for two hours on a steam bath. The reaction mixture is diluted with water, extracted with ethyl acetate and the extract washed successively with dilute acid, sodium bicarbonate solution and water. The ethyl acetate extract is dried, the ethyl acetate distilled and the residue crystallized from ethyl acetate-methanol mixture to obtain the desired trifuroyl derivative of (dl)-ψ-1-p-nitrophenyl-2-aminopropane-1,3-diol of formula,

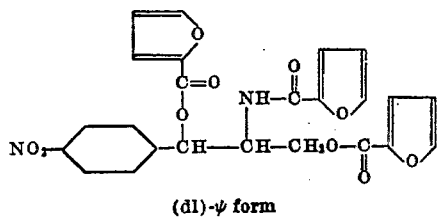

(dl)-ψ form

*Example 19*

2.12 g. of (dl)-ψ-1-p-nitrophenyl-2-aminopropane-1,3-diol in 10 cc. of dry pyridine is treated with 4 g. of succinic anhydride and the mixture heated on a steam bath for one hour. The solution is cooled, diluted with 100 cc. of 2 N hydrochloric acid and extracted with ethyl acetate. The ethyl acetate extract is washed with acidified water (pH 4) and finally with 60 cc. of 0.5 N sodium carbonate solution. The pH of the alkaline wash is brought to 2 with 2 N hydrochloric acid and the crystalline precipitate collected. This product is the tri-half-succinoyl derivative of (dl)-ψ-1-p-nitrophenyl-2-aminopropane-1,3-diol of formula,

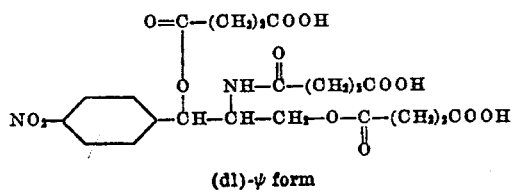

(dl)-ψ form

*Example 20*

2 g. of (l)-reg.-1-p-nitrophenyl-2-aminopropane-1,3-diol in 5 cc. of pyridine is treated with 4 g. of phenylacetyl chloride at 0° C. for one hour. The reaction mixture is diluted with water, extracted with ethyl acetate and the ethyl acetate extract washed successively with dilute hydrochloric acid, sodium bicarbonate solution and water. The ethyl acetate layer is dried and the ethyl acetate distilled in vacuo to obtain the desired triphenylacetyl derivative of (l)-reg.-1-p-nitrophenyl-2-aminopropane-1,3-diol of forumla,

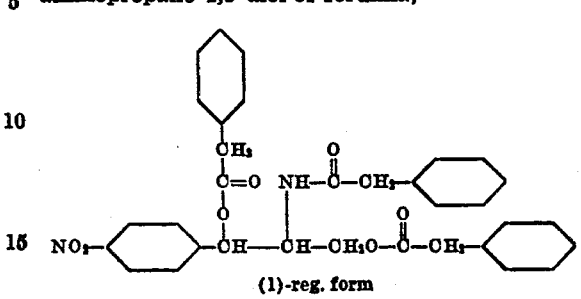

(l)-reg. form

*Example 21*

2 g. of (l)-ψ-1-p-nitrophenyl-2-aminopropane-1,3-diol is heated at 75° C. for one hour with a mixture consisting of 10 cc. of dry pyridine and 6 cc. of methoxyacetic anhydride. The reaction mixture is evaporated to dryness in vacuo, the residue taken up in water, extracted with ethyl acetate and the ethyl acetate layer washed with dilute hydrochloric acid, dilute sodium bicarbonate solution and with water. The extract is dried, the ethyl acetate distilled and the residue purified by recrystallization from methanol. The product thus obtained is (l)-ψ-1-p-nitrophenyl-2-methoxyacetamido-1,3-dimethoxyacetoxypropane of formula,

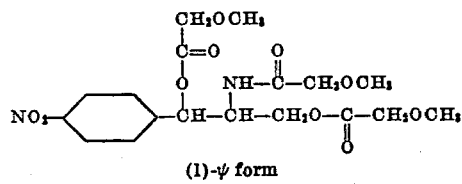

(l)-ψ form

*Example 22*

2.5 cc. of acetic anhydride is added to a solution of 2.9 g. of (dl)-ψ-1-p-nitrophenyl-2-β,β-dimethylacrylamidopropane-1,3-diol in 15 cc. of dry pyridine at room temperature. The reaction mixture is allowed to stand for sixteen hours, 5 cc. of water added and the reaction mixture evaporated to dryness in vacuo. The residue is dissolved in ethyl acetate, the solution washed with 2 N hydrochloric acid, then with sodium bicarbonate solution and finally with water. The ethyl acetate extract is dried and the ethyl acetate distilled. The residual gum is crystallized from ethylene dichloride-petroleum ether mixture or from aqueous methanol to obtain the desired (dl)-ψ-1-p-nitrophenyl-2-β,β-dimethylacrylamido-1,3-diacetoxypropane of formula,

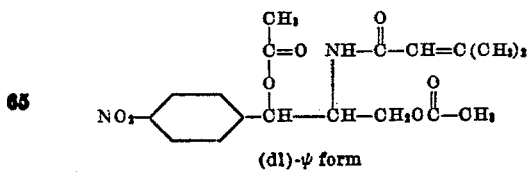

(dl)-ψ form

*Example 23*

2.5 cc. of acetic anhydride is added to a solution of 3.15 g. of (l)-ψ-1-p-nitrophenyl-2-nicotinamidopropane-1,3-diol in 15 cc. of pyridine and the reaction mixture heated at 60° C. for two hours. 5 cc. of water is added and the liquid evaporated to dryness in vacuo. The residue is recrystallized from warm water to obtain the desired (1)-ψ-1-p-nitrophenyl-2-nicotinamido-1,3-diacetoxypropane of formula,

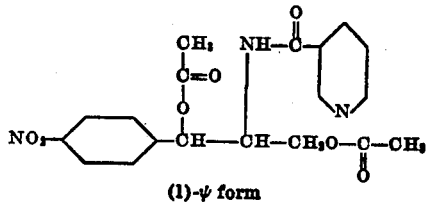

(1)-ψ form where R and R' are the same or different and represent hydrogen or acyl radicals, $R_1$ and $R_2$ are the same or different and represent hydrogen, halogen, lower alkyl or lower alkoxy radicals and $R_3$ is hydrogen or a lower alkyl radical. These starting materials can be prepared in a number of different ways.

One of the general methods which can be used to prepare the compounds of the first depicted type is that represented by the following diagram:

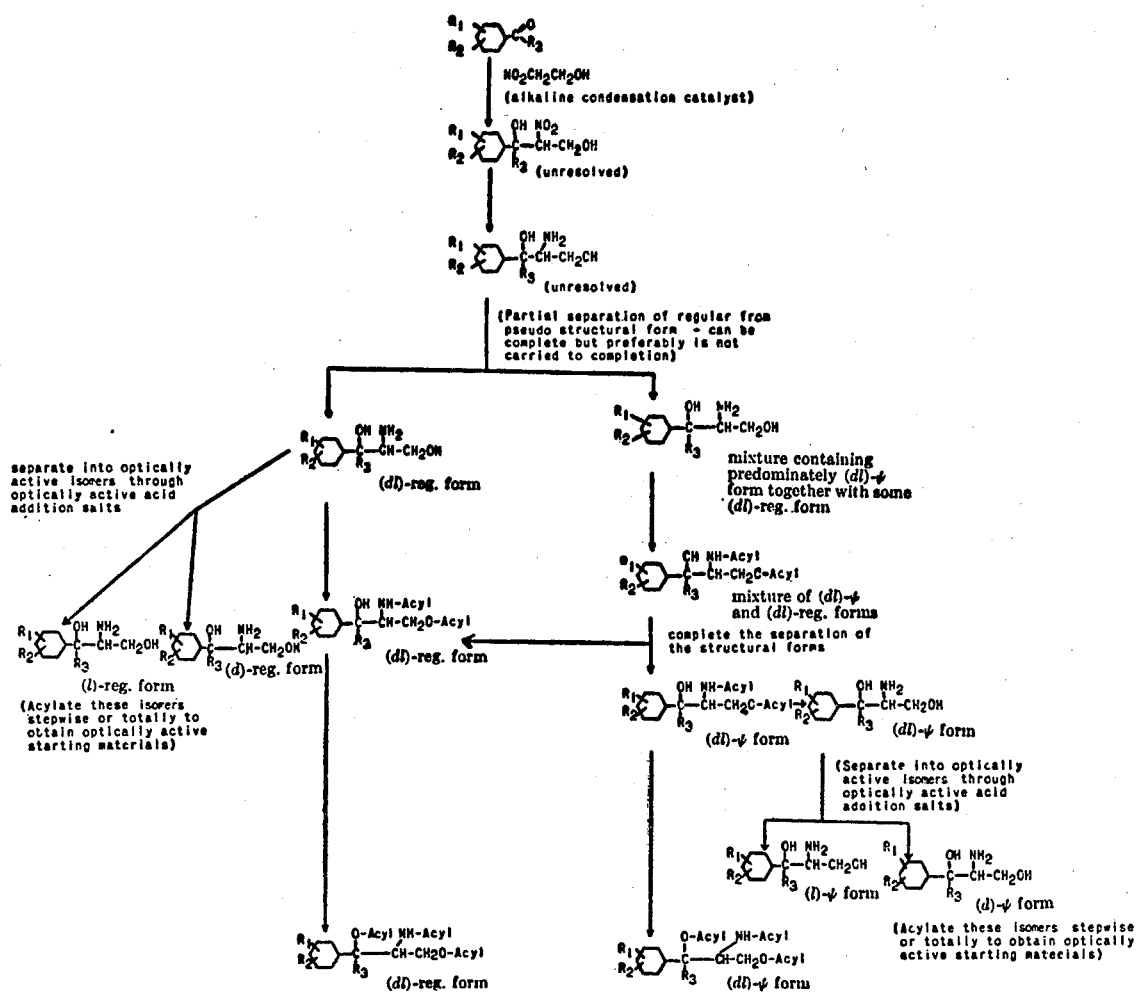

In the foregoing examples we have employed as starting materials products having the formulae,

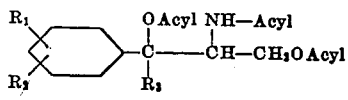

and

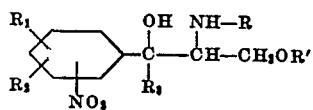

where $R_1$, $R_2$ and $R_3$ have the same significance as given above. The preparation of the unresolved starting materials has not been shown on the above diagram but these products may be prepared by the indicated processes by omitting the steps of separating the structural and optical isomers.

The starting materials used in the alternate method for preparing the compounds of the invention, the products represented by the second of the above formulae, can also be prepared by several different methods. One of these methods is that outlined in the first part of the specification. Another general method which may be used to prepare these starting materials is that represented by the following diagram:

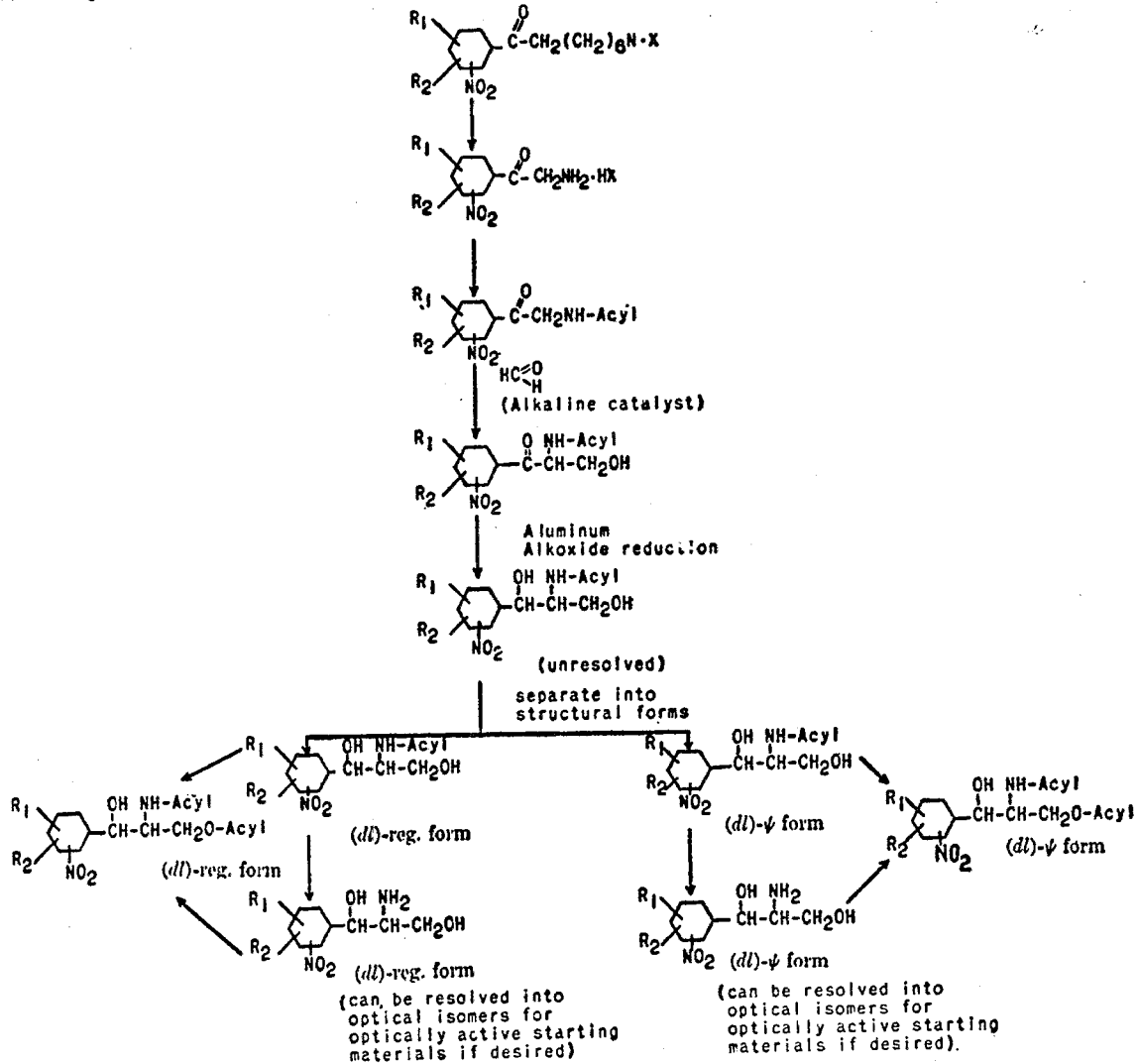

where $R_1$ and $R_2$ have the same significance as given above and X is a halogen atom.

The following examples serve to illustrate the application of these methods to the preparation of some of the specific starting materials used in the foregoing examples.

*Example 24*

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

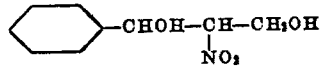

(Unresolved)

can be obtained by acidification of the salt.

20 g. of the sodium salt of 1-phenyl-2-nitropropane-1,3-diol (prepared by the above method) is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is (dl)-reg.-1-phenyl-2-aminopropane-1,3-diol (M. P. 103–4° C.) of formula,

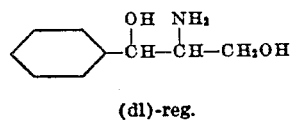

(dl)-reg.

The chloroform filtrate from the crystallization of the (dl)-reg.-1-phenyl-2-aminopropane- 1,3-diol is evaporated to dryness and the residue heated with an excess of acetic anhydride at 70° C. for fifteen minutes. The reaction mixture is evaporated to dryness in vacuo and the residue recrystallized from ethanol. This white crystalline product which melts at 167-8° C. is (dl)-ψ-1-phenyl - 2 - acetamido-3-acetoxypropane-1-ol. It can be represented by the following formula,

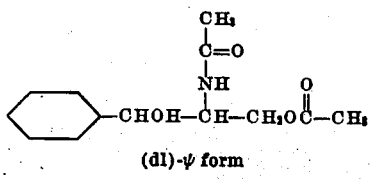

(dl)-ψ form 2 g. of (dl)-ψ-1-phenyl-2-acetamido-3-acetoxypropane-1-ol is added to a mixture composed of 4 cc. of acetic anhydride and 4 cc. of dry pyridine and the resulting mixture heated at 100° C. for about one-half hour. The reaction mixture is evaporated in vacuo and the residue recrystallized from methanol to obtain the triacetate of (dl)-ψ-1-phenyl-2-aminopropane-1,3-diol melting at 79° C. Its formula is:

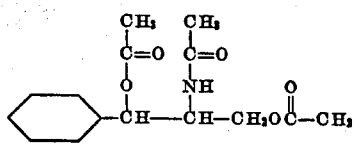

Example 25

10 g. of (dl)-reg.-1-phenyl-2-aminopropane-1,3-diol is heated with a mixture consisting of 20 cc. of pyridine and 20 cc. of acetic anhydride for one-half hour at 100° C. The reaction mixture is evaporated to dryness in vacuo to obtain the desired triacetate of (dl)-reg.-1-phenyl-2-aminopropane-1,3-diol. This same compound can also be obtained by first diacylating the (dl)-reg.-1-phenyl-2-aminopropane-1,3-diol on the amino and terminal hydroxyl groups with acetic anhydride and then subsequently O-acylating the (dl) - reg.-1-phenyl-2-acetamido-3-acetoxypropane-1-ol so obtained with acetic anhydride and pyridine.

Example 26

1.7 g. of (dl)-reg.-1-phenyl-2-aminopropane-1,3-diol is treated with 1.6 g. of methyl dichloroacetate and the mixture heated at 100° C. for one and a quarter hours. The residue is washed with two 20 cc. portions of petroleum ether and the insoluble product collected. Recrystallizaion from ethyl acetate yields the desired (dl)-reg.- 1-phenyl-2-dichloracetamidopropane-1,3 - diol in pure form; M. P. 154-6° C. This product's formula is:

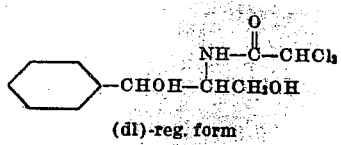

(dl)-reg. form 500 mg. of (dl)-reg. -1-phenyl-2-dichloroacetamidopropane-1,3-diol is added to a solution consisting of 1 cc. of pyridine and 1 cc. of acetic anhydride and the resulting reaction mixture heated at 100° C. for one-half hour. The reaction mixture is evaporated to dryness under reduced pressure and the residue taken up in and crystallized from methanol. Recrystallization from methanol produces the pure diacetate of (dl)- reg.-1-phenyl-2-dichloroacetamidopropane - 1,3-diol (M. P. 94° C.) having the formula,

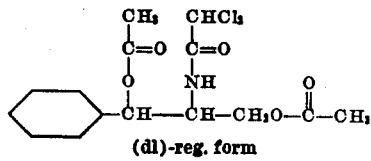

(dl)-reg. form

Example 27

4 g. of (dl)-ψ-1-phenyl-2-acetamido-3-acetoxypropane-1-ol in 25 cc. of 3 N hydrochloric acid is refluxed for about three hours and the reaction mixture evaporated to dryness. The residual hydrochloride salt is taken up in a small amount of water, the solution made alkaline with sodium hydroxide and extracted with ethyl acetate. After drying, the ethyl acetate is evaporated from the extracts in vacuo to obtain the free base of (dl)-ψ-1-phenyl-2-aminopropane-1,3 - diol; M. P. 81-3° C. This product has the formula,

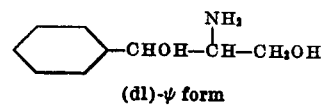

(dl)-ψ form

The free base of (dl)-ψ-1-phenyl-2-aminopropane-1,3-diol obtained above is dissolved in 60 cc. of warm n-butanol containing 5 g. of (d)-camphor sulfonic acid and the mixture cooled. The solid which separates is collected, recrystallized twice from n-butanol and dissolved in a small amount of water containing an excess of sodium hydroxide. The solution is extracted with ethyl acetate, the ethyl acetate extracts dried and the solvent distilled in vacuo. The residue which consists of (l)-ψ-1-phenyl-2-aminopropane-1,3-diol has the formula,

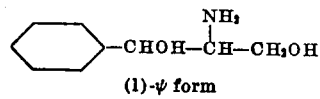

(l)-ψ form 5 g. of (l)-ψ-1-phenyl-2-aminopropane-1,3-diol is heated under reflux with 50 cc. of acetic anhydride for three hours. The reaction mixture is evaporated to dryness in vacuo and the residue recrystallized from methanol to obtain the desired triacetate of (l)-ψ-1-phenyl-2-aminopropane-1,3-diol of formula,

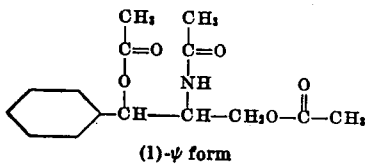

(l)-ψ form

Example 28

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl -2- nitropropane-1,3-diol removed by filtration, washed with ether and dried. Acidification of this sodium salt produces the corresponding free nitro compound, 1-o-methylphenyl-2-nitropropane-1,3-diol, which has the formula,

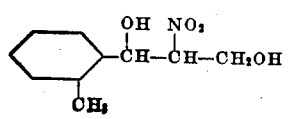

18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the (dl)-regular and (dl)-pseudo 1-o-methylphenyl-2-aminopropane-1,3-diol is taken up in and crystallized from chloroform to obtain the (dl)-reg.-1-o-methylphenyl-2-aminopropane-1,3-diol in crystalline form. Its formula is:

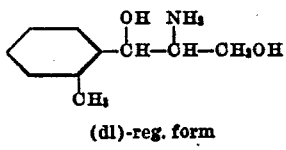

(dl)-reg. form

The chloroform filtrate from which the (dl)-reg.-1-o-methylphenyl-2-aminopropane-1,3-diol has been removed is evaporated in vacuo to obtain the crude (dl)-ψ-1-o-methylphenyl-2-aminopropane-1,3-diol. If desired, the crude (dl)-ψ product can be converted directly to the triacetate by treatment with acetic anhydride and pyridine but we have found it preferable to purify this product through an acyl derivative such as the N-mono acetate or the N, 3-O-diacetate before proceeding further in the synthesis. This purification may be carried out as follows:

1. The crude (dl)-ψ-1-o-methylphenyl-2-aminopropane-1,3-diol is treated with an excess of acetyl chloride at about room temperature in a solvent of dry benzene. When a considerable amount of the hydrochloride salt of (dl)-ψ-1-o-methylphenyl-2-aminopropane-1,3-diol has separated from the solution the reaction is stopped by the addition of 300 cc. of water. After thorough mixing the aqueous solution is removed and saved for recovery of the unacetylated amino diol. The benzene solution is washed with dilute sodium bicarbonate solution and then dried. The benzene is removed by distillation in vacuo and the crude (dl)-ψ-1-o-methylphenyl-2-acetamidopropane-1,3-diol taken up in alcohol and purified by recrystallization from alcohol. The formula of this product is:

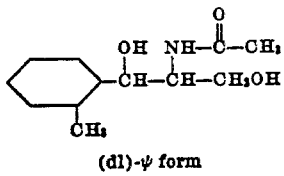

(dl)-ψ form

2. An alternative method for purifying the crude (dl)-ψ-amino diol is as follows:

The crude (dl)-ψ-1-o-methylphenyl-2-aminopropane-1,3-diol is heated with an excess of acetic anhydride at about 70 to 80° C. for fifteen minutes and then the reaction mixture evaporated in vacuo. The residue which consists of (dl)-ψ-1-o-methylphenyl-2-acetamido-3-acetoxypropane-1-ol has the formula,

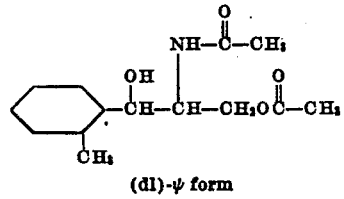

(dl)-ψ form and is purified by recrystallization from ethanol.

5 g. of either (dl)-ψ-1-o-methylphenyl-2-acetamidopropane-1,3-diol or (dl)-ψ-1-o-methylphenyl-2-acetamido-3-acetoxypropane-1-ol is added to a mixture consisting of 10 cc. of acetic anhydride and 10 cc. of pyridine and the resulting mixture heated at 100° C. for about one-half hour. The reaction mixture is concentrated to dryness in vacuo and the residual triacetate of (dl)-ψ-1-o-methylphenyl-2-aminopropane-1,3-diol recrystallized from methanol. The formula of this product is:

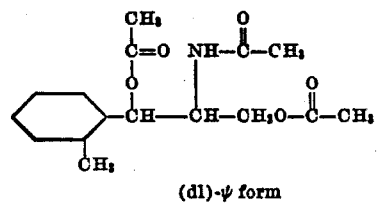

(dl)-ψ form

Substitution of m-methoxybenzaldehyde for the o-methylbenzaldehyde used as the starting material in the above procedure results in the preparation of (dl)-ψ-1-m-methoxyphenyl-2-aminopropane-1,3-diol triacetate. This product has the formula,

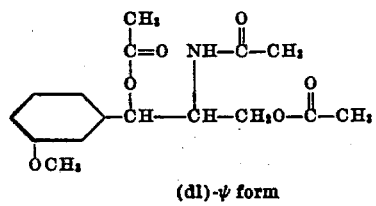

(dl)-ψ form

By replacing the o-methylbenzaldehyde used as the starting material in the above procedure with 3,4-dimethylbenzaldehyde one obtains (dl)-ψ-1-(3',4'-dimethylphenyl)-2-acetamido-1,3-diacetoxypropane of formula,

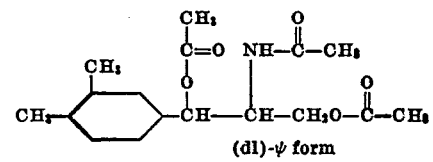

(dl)-ψ form

Similarly, by using acetophenone in the condensation reaction with β-nitroethanol instead of o-methylbenzaldehyde and by following the above described processes, one obtains (dl)-ψ-3-phenyl-2-acetamido-1,3-diacetoxybutane of formula,

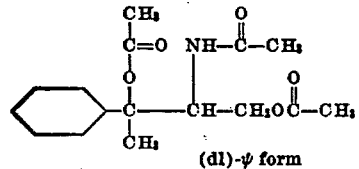

(dl)-ψ form (dl)-ψ-1-o-chlorophenyl-2-acetamido-1,3-diacetoxypropane can be obtained by using o-chlorobenzaldehyde instead of o-methylbenzaldehyde in the above described procedures. However, the preferred method of reducing the 1-o-chlorophenyl-2-nitropropane-1,3 - diol intermediate is by the use of stannous acetate or chloride in acetic acid rather than by the catalytic method disclosed above.

Example 29

71 g. of p-nitro-ω-bromoacetophenone dissolved in 300 cc. of chloroform is added to a solution of 46 g. of hexamethylene tetramine in 600 cc. of chloroform. The solid product begins to separate almost immediately and the temperature of the reaction mixture rises to about 50° C. After allowing the mixture to stand for about two hours the p-nitro-ω-bromoacetophenone-hexamethylene tetramine complex is collected, washed with a little chloroform and dried. The formula of this product is,

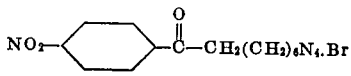

The p-nitro-ω-bromoacetophenone-hexamethylene tetramine complex prepared above is mixed with a cold solution of 500 cc. of absolute ethanol and 100 cc. of concentrated hydrochloric acid and the mixture stirred overnight at room temperature. The solid product which consists of the hydrochloride salt of p-nitro-ω-aminoacetophenone contaminated with minor amounts of the hydrobromide salt and ammonium chloride is collected, washed with 200 cc. of ice cold water to remove the ammonium chloride and dried. The formula of this compound is,

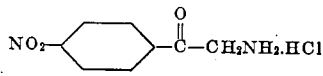

46 g. of p-nitro-ω-aminoacetophenone hydrochloride is mixed with 200 cc. of acetic anhydride and 25 g. of sodium bicarbonate. The mixture is stirred at room temperature and small quantities of ice and water added from time to time. Stirring is continued until the mixture becomes clear and reaches a temperature of about 70° C. The solution is diluted with 900 cc. of water, cooled to 5° C. and the p-nitro-ω-acetamidoacetophenone collected; M. P. 158–61° C. The formula of this product is,

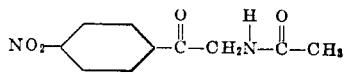

11.1 g. of p-nitro-ω-acetamidoacetophenone is mixed with 55 cc. of methanol and 17 cc. of 36–38% aqueous formaldehyde. 0.4 g. of sodium bicarbonate is added and the mixture stirred at 35° C. for about one hour and a half during which time the solid product separates. The mixture is cooled and stirred for one-half hour. The solid product is collected, washed with water and dried at 60° C. The product thus obtained is p-nitro-α-acetamido-β-hydroxypropiophenone, M. P. 166–7° C., which has the formula,

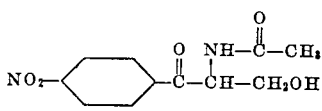

50.6 of p-nitro-α-acetamido-β-hydroxy-propiophenone is mixed with 41 g. of aluminum isopropylate and 600 cc. of dry isopropanol and the mixture heated under reflux for six hours. During the reflux period the acetone which is formed is distilled off and a stream of nitrogen passed through the solution. The isopropanol is distilled from the reaction mixture in vacuo and the residue treated with 750 cc. of dilute hydrochloric acid. The mixture is saturated with sodium chloride and extracted exhaustively with ethyl acetate. The ethyl acetate extracts are dried and the ethyl acetate distilled in vacuo. The residue is extracted with several fresh portions of hot ethyl acetate, the mixture cooled and the residue collected. The ethyl acetate extracts are retained for further purification. The ethyl acetate insoluble residue (M. P. 158–63° C.) which consists of a mixture of (dl)-ψ-1-p-nitrophenyl-2-acetamidopropane-1,3 - diol and the corresponding (dl)-reg. isomer is recrystallized from water to obtain 21 g. of (dl)-ψ-1-p-nitrophenyl-2-acetamidopropane-1,3-diol melting at 166–7° C. The aqueous filtrate is allowed to stand for two days and the crystals which have separated collected. The crystals are (dl)-reg.-1-p-nitrophenyl-2-acetamido-1,3-diol and melt at 185° C. before recrystallization. After recrystallization these crystals melt at 195° C. and weigh 3 g.

The ethyl acetate filtrate is evaporated to dryness in vacuo and the residue treated with about 75 cc. of hot absolute ethanol. The alcohol solution is allowed to stand and the crystalline material which separates collected. This crystalline material is a mixture of the (dl)-ψ and (dl)-reg.-1-p-nitrophenyl-2-acetamidopropane-1,3 - diol. In order to separate it into its two components it is recrystallized from water to obtain 3 g. of the crystalline (dl)-ψ isomer and the (dl)-reg. isomer isolated from the filtrate by allowing it to crystallize on long standing. The yield of the (dl)-reg. isomer obtained at this point is 3 g.

3 g. of (dl)-ψ-1-p-nitrophenyl-2-acetamidopropane-1,3-diol is heated with 30 cc. of 5% hydrochloric acid on a steam bath for one-half hour. The solution is cooled, decolorized with charcoal and the decolorized solution made alkaline to pT 10–11 with sodium hydroxide solution. The fre base of (dl-ψ-1-p-nitrophenyl-2-aminopropan 1,3-diol of formula,

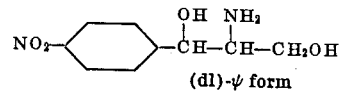

(dl)-ψ form which separates upon standing is collected, washed with cold water and dried; M. P. 140–2° C. If desired, this product can be recrystallized from water.

The (dl)-ψ-1-p-nitrophenyl-2-aminopropane-1,3-diol prepared above is dissolved in a small amount of water and treated with an aqueous solution containing an equivalent amount of (d)-tartaric acid. The solution is evaporated to dryness in vacuo and the residue fractionally crystallized from the minimum amount of hot methanol. The first isomer to separate from the solution in crystalline form is the (d)-tartaric acid salt of (l)-ψ-1-p-nitrophenyl-2-amino-propane-1,3 diol; M. P. 198–200° C. The (d)-tartaric acid salt of (1)-ψ-1-p-nitrophenyl-2-aminopropane-1,3-diol is recovered from the filtrates after removal of the salt of the (l)-isomer.

The (d)-tartaric acid salt of (l)-ψ-1-p-nitrophenyl-2-aminopropane-1,3-diol obtained above is dissolved in water, the solution made alkaline to pH 9 with sodium hydroxide solution and extracted with several portions of ethyl acetate. The combined ethyl acetate extracts are dried and the ethyl acetate evaporated to obtain the free base of (l)-ψ-1-p-nitrophenyl-2-aminopropane-1,3-diol (M. P. 160° C.) having the formula,

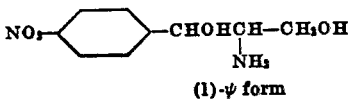

(l)-ψ form

By decomposing the (d)-tartaric acid salt of (d)-ψ-1-p-nitrophenyl-2-aminopropane-1,3-diol in the same manner as described above for the (l)-isomer, one obtains the free base of (d)-ψ-1-p-nitrophenyl-2-aminopropane-1,3-diol.

1 g. of (l)-ψ-1-p-nitrophenyl-2-aminopropane-1,3-diol is refluxed for one hour with 40 cc. of ethyl acetate. The ethyl acetate is distilled off and the residue which consists of the desired (l)-ψ-1-p-nitrophenyl-2-acetamidopropane-1,3-diol crystallized from ethylene dichloride; M. P. 125–6° C. The formula of this product is,

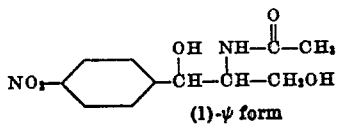

(l)-ψ form 2 g. of (l)-ψ-1-p-nitrophenyl-2-acetamidopropane-1,3-diol is heated with 10 cc. of acetic anhydride at 65° C. for fifteen minutes and then the reaction mixture evaporated to dryness in vacuo. The residue is recrystallized from ethanol to obtain the desired (l)-ψ-1-p-nitrophenyl-2-acetamido-3-acetoxypropane-1-ol of formula,

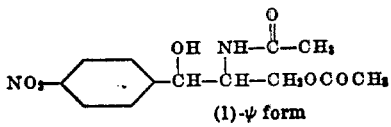

(l)-ψ form

What we claim is:
1. A compound of the formula,

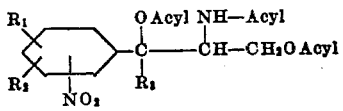

where $R_1$ and $R_2$ are members of the class consisting of hydrogen, halogen, lower alkyl and lower alkoxy radicals and $R_3$ is a member of the class consisting of hydrogen and lower alkyl radicals, said Acyl being a carboxylic acid acyl radical.

2. A compound of the formula,

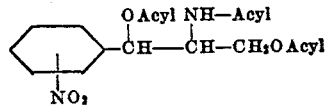

said Acyl being a carboxylic acid acyl radical.

3. A compound of the formula,

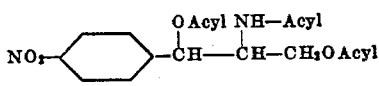

said Acyl being a carboxylic acid acyl radical.

4. A compound of the formula,

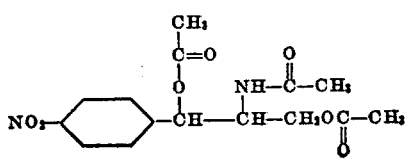

5. A compound of the formula,

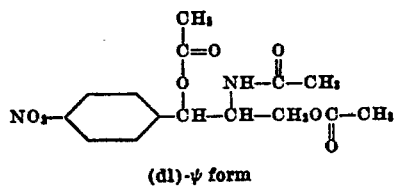

(dl)-ψ form

6. A compound of the formula,

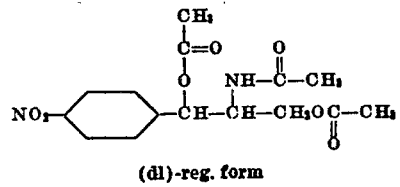

(dl)-reg. form

7. A compound of the formula,

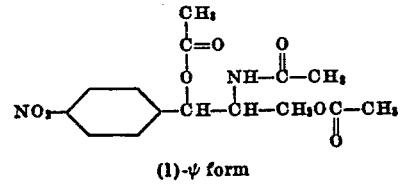

(l)-ψ form

8. Process which comprises nitrating a compound of the formula,

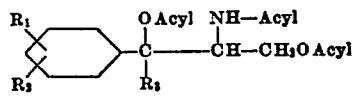

with a nitrating agent of the class consisting of 100% nitric acid, fuming nitric acid and a mixture of concentrated nitric and sulfuric acids to obtain a compound of the formula,

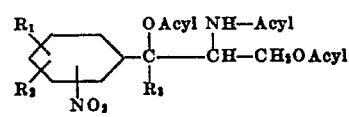

where $R_1$ and $R_2$ are members of the class consisting of hydrogen, halogen, lower alkyl and lower alkoxy radicals and $R_3$ is a member of the class consisting of hydrogen and lower alkyl radicals, said Acyl being a carboxylic acid acyl radical.

9. Process which comprises nitrating a compound of the formula,

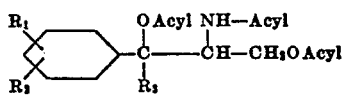

with a mixture of concentrated sulfuric and nitric acids at a temperature below about 25° C. to obtain a compound of the formula,

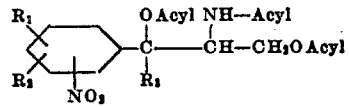

where $R_1$ and $R_2$ are members of the class consisting of hydrogen, halogen, lower alkyl and lower alkoxy radicals and $R_3$ is a member of the class consisting of hydrogen and lower alkyl radicals, said Acyl being a carboxylic acid acyl radical.

10. Process which comprises nitrating a compound of the formula,

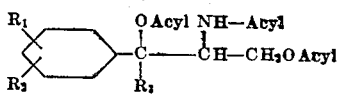

with fuming nitric acid at a temperature below about 50° C. to obtain a compound of the formula,

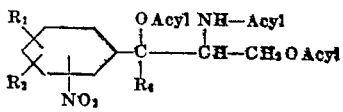

where $R_1$ and $R_2$ are members of the class consisting of hydrogen, halogen, lower alkyl and lower alkoxy radicals and $R_3$ is a member of the class consisting of hydrogen and lower alkyl radicals, said Acyl being a carboxylic acid acyl radical.

11. Process which comprises nitrating a compound of the formula,

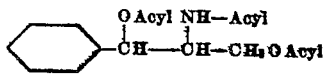

with a nitrating agent of the class consisting of 100% nitric acid, fuming nitric acid and a mixture of concentrated nitric and sulfuric acids at a temperature below about 50° C. to obtain a compound of the formula,

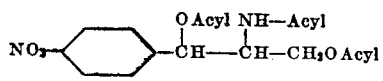

said Acyl being a carboxylic acid acyl radical.

12. 1-(nitrophenyl) - 2 - (dichloroacetamido)-1,3-diacetoxy-propane.

HARRY M. CROOKS, JR.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
|---|---|---|
| 2,103,266 | Lott | Dec. 28, 1937 |